United States Patent Office 3,109,744
Patented Nov. 5, 1963

3,109,744
VALVE PACKING COMPOSITION
Glenn A. Puttroff, Houston, Tex., assignor to ACF Industries, Incorporated, New York, N.Y., a corporation of New Jersey
No Drawing. Filed May 19, 1960, Ser. No. 30,285
10 Claims. (Cl. 106—199)

This invention relates to a packing composition and more particularly to a valve packing composition especially adapted for use as valve stem packing.

The stems of gate valves normally pass through a passageway in the bonnet of the valve. In order to prevent leakage through the space between the stem and passageway, a packing box is provided. Various types of packing have been utilized in the packing box. In order to permit the packing to be replenished and to provide an external means of adding additional packing, the packing box may be provided with a replenishable packing composition contained between two sets of chevron rings. Various packing compositions have been employed in such applications. Since the packing problem is a very old one, the most diverse compositions of matter have been described for serving the purpose. In general, the most common packing materials of the prior art are composed of fibrous substances impregnated with various lubricants. In order to work satisfactorily as a valve stem packing, the composition must have a high resistance to the ladings which flow through the valve. Normally in valves, this is a resistance to oils and hydrocarbons. Also, the composition must not harden within the operating temperature range of the valve. Further, the composition must be of a lubricating nature so it will not bind the stem when the valve is being operated. In some instances, the valve will remain stationary over an extended period, therefore the composition must not be affected by aging. Additionally, the composition has to be pliable at low temperatures so that it will flow around the packing rings and effect a seal. While certain packings available in the prior art may have advantages as to some phases, the same packings will usually have disadvantages as to other phases.

It is an object of the present invention to provide an improved composition for use as a valve stem packing which has a high resistance to oils and hydrocarbons and which will increase the operating temperature range of the valve.

It is another object to produce an improved composition having in addition to the above mentioned characteristics as low a coefficient of friction as possible.

It is a further object to provide an improved composition for valve stems that is pliable at low temperatures.

It is still a further object to provide an improved packing composition which will tend to remain pliable after long periods of time.

It is still a further object to provide an improved packing composition having the above characteristics which is adaptable for the use in a valve stem packing box by being very flexible so that it can be produced in strips which can be wound around the stem without cracking and can be produced in forms to permit replenishing of the packing.

The foregoing and other objects of this invention not specifically enumerated are accomplished by providing an improved packing composition comprised of chemically polymerized castor oil, triethanolamine, stiffener and a filler.

While castor oil has good resistance to controlling hydrocarbons and water at temperatures above 200° F., the castor oil oxidizes and gels until the final product becomes very stiff and dry. It has been found that by using chemically polymerized castor oil, embodied by a chemical reaction rather than by oxidation, that the heat stability of the castor oil is greatly increased. It has also been found that triethanolamine is a good antioxidant for chemically polymerized castor oil and by adding about 5% triethanolamine the mixture can be used as high as 350° F. rather than the 200° F. previously mentioned.

As previously mentioned, the packing composition is utilized in the packing box to aid in preventing the lading in the valve flowing through the space between the stem and passageway and escaping exteriorly of the valve body. Accordingly, the packing composition has to have a good resistance to the ladings which flow through the valve, otherwise the ladings after any prolonged period of time will deteriorate the packing and leakage will result. Many valves are positioned in places which are often hard to service and are oftentimes located in remote locations where inspection is most spasmodic. Therefore, it is essential since inspection and servicing may be infrequent that the composition has a good resistance to particular valve ladings. It is also essential that the composition does not harden or age and seize the valve stem which would unduly increase the torque required to operate the valve. This is particularly true in valves which may be operated only infrequently. It is also desirable that the composition have a high stability against heat deterioration. The temperature requirements under which a valve must operate are constantly being raised and what was considered high temperature service in the not too distant past is now considered normal valve service. Therefore, while the present composition is not a packing designed for high temperature service, its operating range has been extended considerably over the previous available standard packings. The packing must also remain flexible under low temperatures so that particularly in gas service it will flow in the area between the packing ring and the wall of the packing box and the packing ring and stem and seal this area.

According to the present invention, it has been discovered that chemically polymerized castor oil, which is bodied castor oil produced by chemical reaction other than oxidation, is extremely stable in its viscosity with a viscosity of 1200–1400 Engler seconds. By adding about 5% triethanolamine to such polymerized castor oil, the heat stability shows a marked increase. While castor oil bodied by oxidation will gel at 250° F. in 48 hours, the new chemically polymerized castor oil will last about a month at 300° F. Moreover, the mixture of chemically polymerized castor oil with 5% triethanolamine will last three months at 350° F. The above aging tests were conducted in an atmosphere of air. Since a packing composition as normally used in a valve is isolated from the atmosphere, the life of the packing will be markedly extended over the above examples. Using the chemically polymerized castor oil and triethanolamine mixture as a base, several samples of packing composition were compounded.

The first sample, 36% of polymerized castor oil and 5% of triethanolamine, was stiffened by adding 4% of carnauba wax and 3% of Acrawax Plain (all percentages above and hereafter are by weight). The carnauba wax is a natural wax derived from exudation of Brazilian wax palm. Acrawax Plain is a synthetic wax—a modified fatty acid ester—chemically known as N,N'-ethylene bis-stearamide. As a packing composition requires a certain amount of filler material, 41% of chrysolite asbestos fibers and 10% of wood chips were added. The wood chips were used to give greater body and were commercial wood chips with 100% passing 10 mesh screen and 70% retained by 20 mesh screen. As the exact chemical and physical characteristics of any asbestos fiber varies from mining area to mining area and to some extent within a single mine, the approximate formula for chrysolite asbestos is given as (Mg, Fe)$_2$SiO$_4$ and the chemical analysis as an average value is given below. While the approximate formula for crocidolite asbestos is given as NaFe(SiO$_3$)$_2$FeSiO$_3$ and the chemical analysis as an average value is given below.

*Typical Chemical Analysis*

|  | Crysolite | Crocidolite |
|---|---|---|
| Silica | 40.3 | 51.4 |
| Alumina | 0.7 | ------ |
| Ferrous Oxide | 1.0 | 20.3 |
| Ferric Oxide | 1.5 | 17.5 |
| Manganous Oxide | ------ | 0.1 |
| Calcium Oxide | 0.2 | 0.8 |
| Magnesium Oxide | 42.4 | 1.4 |
| Sodium Oxide | ------ | 6.2 |
| Potassium Oxide | ------ | ------ |
| Carbon Dioxide | 0.2 | 0.4 |
| Water of Crystallization | 13.7 | 1.9 |

In order to give the mixture a definite color, 1% of red ferric oxide was added. In a later sample, the polymerized castor oil was increased to 50% with 5% of triethanolamine to which 3% each of carnauba wax and Acrawax Plain were added. The filler material in this sample was 21% of chrysolite asbestos, 8% of crocidolite asbestos and 9% of wood chips. 1% red ferric oxide was added as a coloring agent. Since wood chips are essentially for the purpose for providing a composition with greater body so that it can bridge a wider gap, a sample was made up without the wood chips. This sample consisted of 37% of polymerized castor oil, 5% of triethanolamine, 11% carnauba wax, 20% of mica, 25% of asbestos and 2% yellow iron oxide. In other samples having 38–39% chemically polymerized castor oil, 4% triethanolamine, 4% carnauba wax and 4–5% N,N'-ethylene bis-stearamide, the filler materials were 25–28% asbestos, 10% wood chips and 10–13% mica. Other samples were made by substituting other synthetic waxes such as hydrogenated castor oil sold under the trade name of "Caster Wax," saturated hydroxylated amide waxes sold under the trade name "Paracin" and synthetic fatty amide waxes sold under the trade name of "Carlisle." While carnauba and Acrawax Plain are preferred, the above can be substituted.

In an effort to eliminate the waxes, samples were made up using other materials as stiffeners. One sample was comprised of 35% of polymerized castor oil, 4% of triethanolamine, 15% of aluminum ricinoleate, 35% of chrysolite asbestos, 10% of wood chips and 1% red ferric oxide. A further sample was made using 37% of polymerized castor oil, 5% of triethanolamine, 12% of dimethyl dioctadecyl ammonium bentonite, commercially available under the trade name Baragel #27, 35% of chrysolite asbestos shorts, 10% of wood chips and 1% red ferric oxide. It was found from the experiments that limits could be set as follows: 30 to 60% of chemically polymerized castor oil, 3 to 7% of triethanolamine, 5 to 20% of stiffener and 30 to 60% of filler material. The term stiffener as herein used is a chemical compound which when mixed together with chemically polymerized castor oil, triethanolamine and fillers will form a compatible mixture that will not separate under pressure or heat or a combination of either. The stiffener must also be selected from that group of chemical compounds which will provide maximum chemical resistance against the ladings to which the packing composition may be subjected. At the same time the stiffener should be such that it lubricates the packing composition and permits the stem to be turned with ease. It has been found that the following may be used as stiffeners: natural or synthetic waxes, fatty acid soaps or dimethyl dioctadecyl ammonium bentonite, commercially available under the trade name Baragel #27. The term "filler" as herein used is a material which when mixed together with chemically polymerized castor oil, triethanolamine and stiffeners will form a compatible mixture stiff enough to prevent flow under pressure and yet soft enough to be extrudable easily through the packing fitting so the packing may be replenished. The filler must have maximum chemical resistance to the line lading to which the composition will be subjected. In addition, the filler must be selected so that the composition will not score or cause undue wear on the valve stem as it is turned. Another essential of the filler is its ability to bridge small cracks or crevices and stop leakage should the packing be partly soluble in the line lading. It has been found that the following may be used as fillers: chrysolite asbestos fibers, crocidolite asbestos fibers, wood chips, mica, talc or graphite.

Two samples were extensively tested. One sample, designated Sample A, was comprised of 35% of polymerized castor oil, 5% of triethanolamine, 4% of carnauba wax, 3% of Acrawax Plain, 39% of asbestos shorts, 13% of wood chips and 1% of red ferric oxide. The other sample, designated Sample B, was composed of 37% of polymerized castor oil, 5% of triethanolamine, 11% of carnauba wax, 20% of mica, 25% of asbestos shorts and 2% of yellow iron oxide.

The samples had the following physical characteristics:

| | |
|---|---|
| Color | Maroon (Sample A), Yellow (Sample B). |
| Temperature range | 0° to 350° F. |
| Stability | Good within temperature range. |
| Corrosion | None. |
| Toxicity | None. |

To test samples A and B, two valve bonnet assemblies were fabricated. To supply the initial packing, a strip of the packing composition was wrapped around the stem of the bonnet assembly. After the assembly was completed, additional packing in the form of sticks was introduced into the packing box through a packing fitting. The packing screw was used to build up the pressure. A turning torque at various pressures was as follows:

| Packing Pressure, p.s.i. | Turning Torque, ft.lbs. | |
|---|---|---|
| | Sample #A | Sample #B |
| 0 | 1 | 1 |
| 1,000 | 2 | 2 |
| 2,000 | 4 | 3 |
| 3,000 | 5 | 4 |
| 4,000 | 5 | 5 |
| 5,000 | 5 | 5 |
| 6,000 | 6 | 6 |
| 7,000 | 6 | 7 |
| 8,000 | 6 | 7 |

Prepared bonnet assemblies were then set aside and tested at various intervals to see if the turning torque would increase with age. The packing pressure was built up to 8000 p.s.i. at the start and would usually drop 1000 to 1200 p.s.i. before the next testing period. The packing pressure was then built up to 8000 p.s.i. before the torque tests were made.

| Time in Days | Turning Torque, ft.lbs. | |
|---|---|---|
| | Sample #A | Sample #B |
| 1 | 6 | 7 |
| 10 | 6 | 7 |
| 20 | 6 | 8 |
| 40 | 7 | 9 |
| 60 | 8 | 10 |
| 80 | 10 | 10 |
| 100 | 12 | 14 |
| 120 | 14 | 16 |

In order to check the pliability of the packing at low temperature, a packing fitting was filled with the plastic composition until part of the composition was extruded past the ball check. The packing fitting was then placed in the refrigerator for a period of at least two hours. At the end of the two-hour period, the fitting was removed from the refrigerator, placed in a vise and a torque wrench used to determine the amount required to extrude the packing at the rate of one revolution per ten seconds.

| Temp. in °F. | Torque Readings, ft.lbs. | |
|---|---|---|
| | Sample #A | Sample #B |
| 77 | 1 | 1 |
| 60 | 1 | 1 |
| 50 | 1 | 1 |
| 40 | 2 | 2 |
| 30 | 3 | 3 |
| 20 | 3 | 3 |
| 10 | 5 | 5 |
| 0 | 6 | 7 |
| −10 | 12 | 13 |
| −20 | 27 | 27 |
| −30 | 47 | 47 |

To determine if the packing would extrude around the packing rings, another bonnet assembly was made up. The bonnet was filled with the packing composition to a pressure of 5000 p.s.i. and the stem turned 25 times. The pressure was released and built back to 5000 p.s.i. The bonnet was set aside and checked daily for evidence of packing extruding around the lower set of chevron rings and pressure drop. The same procedure as explained above was followed in checking the bonnets at 10,000 p.s.i. It was found that a very small amount of packing extruded through the lower chevron rings around the stem in the initial building up of the packing pressure to 5000 p.s.i. No further extrusion of the packing composition was noted for Sample A.

Sample B extruded through the bottom chevron rings around the stem about one inch below the bottom of the bonnet during the initial building of the pressure to 5000 p.s.i. No further extrusion of the packing was noted during the tests at 5000 and 10,000 p.s.i.

5000 P.S.I. EXTRUSION TESTS

| Time in Days | Packing Pressure, p.s.i. | |
|---|---|---|
| | Sample #A | Sample #B |
| Start | 5,000 | 5,000 |
| 1 | 4,800 | 4,700 |
| 2 | 4,700 | 4,100 |
| 3 | 4,400 | 3,900 |
| 4 | 4,000 | 3,800 |
| 7 | 3,900 | 3,800 |
| 8 | 3,800 | 3,800 |
| 9 | 3,700 | 3,700 |

10,000 P.S.I. EXTRUSION TESTS

| Start | 10,000 | 10,000 |
|---|---|---|
| 1 | 9,900 | 9,800 |
| 2 | 9,700 | 9,500 |
| 3 | 9,500 | 9,200 |
| 4 | 9,400 | 9,200 |
| 7 | 9,200 | 8,900 |
| 8 | 9,100 | 8,700 |
| 9 | 9,000 | 8,700 |
| 10 | 9,000 | 8,600 |

To check the heat stability of the compositions, the bonnets were packed with the two samples to a pressure of 2000 p.s.i. and placed in the oven at 300° F. The bonnets were removed from the oven at periodic intervals and the stem turning torque checked.

| Time in Days at 300° F. | Packing Pressure | Torque to Turn Stem, ft. lbs. | |
|---|---|---|---|
| | | Sample #A | Sample #B |
| Start | 2,000 | 4 | 4 |
| 1 | 2,000 | 0 | 0 |
| 4 | 2,000 | 1 | 1 |
| 8 | 2,000 | 3 | 2 |
| 12 | 2,000 | 5 | 7 |
| 18 | 2,000 | 4 | 3 |
| 24 | 2,000 | 3 | 3 |
| 30 | 2,000 | 3 | 3 |
| 36 | 2,000 | 3 | 3 |
| 42 | 2,000 | 3 | 3 |
| 48 | 2,000 | 3 | 2 |
| 54 | 2,000 | 3 | 3 |
| 60 | 2,000 | 3 | 3 |

At the end of 60 days at 300° F. the bonnets were disassembled and the following conditions were noted:

*Sample A.*—The packing had stiffened some but was still flexible. This sample had more flexibility and pliability than Sample B. The fresh packing could be forced into the packing fitting and the old packing could be extruded which was stiffened but still pliable and flexible.

*Sample B.*—The packing had stiffened but there was still some flexibility left. This sample was not as flexible as the development Sample A. Fresh packing was forced into the packing fitting and the old packing could be extruded which was stiffened but still had some flexibility left.

To test the resistance of the packing compositions to solvent and chemical action of the line lading to which it might be exposed, two ⅜" x 1" sticks were placed in a test tube of the fluid against which the packing was to be tested. The test tube was closed with a stopper and left for seven days at room temperature (77° F.) or at the indicated temperature. At elevated temperatures, a reflux condenser was used. At the end of that test period any swelling or breakdown of the packing was recorded.

| Service | Time, days | Temp., °F. | Sample #A | Sample #B |
|---|---|---|---|---|
| Benzene | 7 | 77 | Broken up | Broken up. |
| Calcium Chloride (20%). | 7 | 77 | Intact | Intact. |
| Crude Oil | 7 | 77 | do | Do. |
| Do | 7 | 300 | Softened | Softened. |
| Cutting Oil | 7 | 77 | Intact | Intact. |
| Do | 7 | 300 | Very Soft | Very Soft. |
| Ethyl Alcohol | 7 | 77 | do | Do. |
| Bunker C—Fuel Oil | 7 | 77 | Intact | Intact. |
| Gasoline—Ethyl | 7 | 77 | do | Do. |
| Do | 7 | 150 | Very Soft | Very Soft. |
| Gasoline—Regular | 7 | 77 | Intact | Intact. |
| Do | 7 | 150 | Very Soft | Very Soft. |
| Glycerine | 7 | 77 | Intact | Intact. |
| Do | 7 | 300 | do | Do. |
| Hexane | 7 | 77 | do | Do. |
| Kerosene | 7 | 77 | do | Do. |
| Do | 7 | 150 | Softened | Softened. |
| Linseed Oil | 7 | 77 | Intact | Intact. |
| Do | 7 | 300 | Softened | Softened. |
| Lubricating Oil | 7 | 77 | Intact | Intact. |
| Do | 7 | 300 | do | Do. |
| Methyl Alcohol | 7 | 77 | Very Soft | Very Soft. |
| Mineral Oil | 7 | 77 | Intact | Intact. |
| Do | 7 | 300 | do | Do. |
| Mineral Spirits | 7 | 77 | do | Do. |
| Do | 7 | 150 | Softened | Softened. |
| Paraffin Oil | 7 | 77 | Intact | Intact. |
| Do | 7 | 300 | do | Do. |
| Petroleum Naptha | 7 | 77 | do | Do. |
| Do | 7 | 150 | Softened | Softened. |
| Sodium Chloride (20%). | 7 | 77 | Intact | Intact. |
| Do | 7 | 212 | Softened | Softened. |
| Soluble Oil D | 7 | 77 | do | Do. |
| Do | 7 | 300 | Very Soft | Very Soft. |
| Sulfuric Acid (20%) | 7 | 77 | Softened | Softened. |
| Trichlorethylene | 7 | 77 | Broken Up | Broken Up. |
| Water | 7 | 77 | Intact | Intact. |
| Do | 7 | 212 | Softened | Softened. |
| Xylene | 7 | 212 | Broken Up | Broken Up. |

For more accuracy, five representative solvents were selected and a weighed amount of packing composition was placed in the test tube full of the solvent. The test tube was closed with a stopper and left for seven days at room temperature (77° F.). At the end of this period, any swelling or breakdown of the packing was recorded. The packing was then removed from the test tube, dried and the loss or gain in weight was recorded.

|  | Solvent | Percent Loss or Gain in Weight | Physical Condition |
|---|---|---|---|
| Sample #A | a. gasoline | −6.5 | Softened. |
|  | b. crude oil | +3.4 | Intact. |
|  | c. kerosene | −4.9 | Do. |
|  | d. hexane | −4.1 | Do. |
|  | e. water | −1.6 | Do. |
| Sample #B | a. gasoline | −6.8 | Softened. |
|  | b. crude oil | +3.8 | Intact. |
|  | c. kerosene | −5.2 | Do. |
|  | d. hexane | −4.5 | Do. |
|  | e. water | −1.6 | Do. |

To make the composition, the chemically polymerized castor oil and triethanolamine and stiffeners are heated to 225° F., or about 40° higher than the melting point of the stiffener, and held at this temperature until the stiffeners are melted. While the mixture is being agitated, the filler material is added. The composition can then be extruded into strips which have a high degree of flexibility and can be wrapped without breaking around a one inch cylindrical stem. Also, the cylindrical rods can be extruded which are later cut into lengths and used as sticks for replenishing packing.

As can be seen from the foregoing, a mixture of chemically polymerized castor oil with triethanolamine to which stiffeners and fillers are added makes an excellent packing composition which has a high degree of chemical resistance to most materials used in valves, has an increased temperature range, remains pliable at low temperatures, will not bind, has excellent aging qualities and can be made in strips which are sufficiently flexible to be wound around this stem.

What I claim is:

1. A valve packing composition having the following composition:

| | Percent by weight |
|---|---|
| Chemically polymerized castor oil | 30–60 |
| Triethanolamine | 3–7 |
| Stiffener selected from the group consisting of carnauba wax, NN′ ethylene bis-stearamide, aluminum ricinoleate, and dimethyl diocetadecyl ammonium bentonite | 5–20 |
| Filler | 30–60 |

2. A valve packing composition having the following composition:

| | Percent by weight |
|---|---|
| Chemically polymerized castor oil | 30–60 |
| Triethanolamine | 3–7 |
| Carnauba wax | 5–20 |
| Filler material | 30–60 |

3. A valve packing composition having the following composition:

| | Percent by weight |
|---|---|
| Chemically polymerized castor oil | 35 |
| Triethanolamine | 5 |
| Carnauba wax | 4 |
| NN′ ethylene bis-stearamide | 3 |
| Asbestos | 39 |
| Wood chips | 13 |
| Red ferric oxide | 1 |

4. A valve packing composition having the following composition:

| | Percent by weight |
|---|---|
| Chemically polymerized castor oil | 37 |
| Triethanolamine | 5 |
| Carnauba wax | 11 |
| Mica | 20 |
| Asbestos | 25 |
| Yellow iron oxide | 2 |

5. A valve packing composition having the following composition:

| | Percent by weight |
|---|---|
| Chemically polymerized castor oil | 36 |
| Triethanolamine | 5 |
| Carnauba wax | 4 |
| NN′ ethylene bis-stearamide | 3 |
| Asbestos | 41 |
| Wood chips | 10 |
| Red ferric oxide | 1 |

6. A valve packing composition having the following composition:

| | Percent by weight |
|---|---|
| Chemically polymerized castor oil | 50 |
| Triethanolamine | 5 |
| Carnauba wax | 3 |
| NN′ ethylene bis-stearamide | 3 |
| Asbestos | 29 |
| Wood chips | 9 |
| Red ferric oxide | 1 |

7. A valve packing composition having the following composition:

| | Percent by weight |
|---|---|
| Chemically polymerized castor oil | 39 |
| Triethanolamine | 4 |
| Carnauba wax | 4 |
| NN′ ethylene bis-stearamide | 4 |
| Asbestos | 28 |
| Wood chips | 10 |
| Mica | 10 |
| Red ferric oxide | 1 |

8. A valve packing composition having the following composition:

| | Percent by weight |
|---|---|
| Chemically polymerized castor oil | 38 |
| Triethanolamine | 4 |
| Carnauba wax | 4 |
| NN′ ethylene bis-stearamide | 5 |
| Asbestos | 25 |
| Wood chips | 10 |
| Talc | 13 |
| Red ferric oxide | 1 |

9. A valve packing composition having the following composition:

| | Percent by weight |
|---|---|
| Chemically polymerized castor oil | 35 |
| Triethanolamine | 4 |
| Aluminum ricinoleate | 15 |
| Asbestos | 35 |
| Wood chips | 10 |
| Red ferric oxide | 1 |

10. A valve packing composition having the following composition:

| | Percent by weight |
|---|---|
| Chemically polymerized castor oil | 37 |
| Triethanolamine | 5 |
| Dimethyl dioctadecyl ammonium bentonite | 12 |
| Asbestos | 35 |
| Wood chips | 10 |
| Red ferric oxide | 1 |

References Cited in the file of this patent

UNITED STATES PATENTS

| 2,223,244 | Bohm et al. | Nov. 26, 1940 |
| 2,377,030 | Norris | May 29, 1945 |
| 2,427,431 | Wieland | Sept. 16, 1947 |